United States Patent
Mizuno

(10) Patent No.: US 11,421,988 B2
(45) Date of Patent: Aug. 23, 2022

(54) LASER MARKER AND ELECTRONIC LEVELING METHOD OF LASER MARKER

(71) Applicant: MAKITA CORPORATION, Anjo (JP)

(72) Inventor: Shunta Mizuno, Anjo (JP)

(73) Assignee: MAKITA CORPORATION, Anjo (JP)

( * ) Notice: Subject to any disclaimer, the term of this patent is extended or adjusted under 35 U.S.C. 154(b) by 266 days.

(21) Appl. No.: 16/816,326

(22) Filed: Mar. 12, 2020

(65) Prior Publication Data
US 2020/0300626 A1 Sep. 24, 2020

(30) Foreign Application Priority Data
Mar. 22, 2019 (JP) .............................. JP2019-054991

(51) Int. Cl.
*G01C 15/00* (2006.01)
*G01B 11/26* (2006.01)

(52) U.S. Cl.
CPC ............ *G01C 15/004* (2013.01); *G01B 11/26* (2013.01)

(58) Field of Classification Search
CPC ....... G01C 15/004; G01C 15/00; G01B 11/26
USPC ...................................................... 356/139.1
See application file for complete search history.

(56) References Cited

U.S. PATENT DOCUMENTS 5,485,266 A * 1/1996 Hirano ................... G01B 11/26
33/291
9,207,078 B2 * 12/2015 Schorr ................. G01C 15/008

FOREIGN PATENT DOCUMENTS

JP 3082052 B2 8/2000

OTHER PUBLICATIONS

"Normal mode," Wikipedia, 2021, downloaded Jan. 27, 2022 from https://en.wikipedia.org/wiki/Normal_mode, 10 pp. (Year: 2021).*
"Signals and the frequency domain," Stanford, 2017, downloaded Jan. 27, 2022 from https://web.stanford.edu/class/archive/engr/engr40m.1178/slides/signals.pdf, 6 pp. (Year: 2017).*
Kelley et al 1995, "LTC6244 High Speed Peak Detector", downloaded Jan. 27, 2022 from https://www.analog.com/en/technical-articles/ltc6244-high-speed-peak-detector.html (Year: 1995).*

* cited by examiner

*Primary Examiner* — Daniel L Murphy
(74) *Attorney, Agent, or Firm* — Oliff PLC

(57) ABSTRACT

In one aspect of the present disclosure, a laser marker includes a supporter, a movable portion, at least one laser optical source, a tilt sensor, a first actuator, and a controller. The movable portion is tiltably supported by the supporter. The tilt sensor is provided to the movable portion, detects a first tilt of the movable portion, and outputs a first detection value that indicates the first tilt. The first actuator changes a tilt of the movable portion with respect to the supporter. The controller controls the first actuator such that a center value of a first series of detection values and a reference value coincide with each other.

15 Claims, 14 Drawing Sheets

LASER MARKER AND ELECTRONIC LEVELING METHOD OF LASER MARKER

CROSS-REFERENCE TO RELATED APPLICATIONS

The present disclosure claims the benefit of Japanese Patent Application No. 2019-054991 filed on Mar. 22, 2019 with the Japan Patent Office, the entire disclosure of which is incorporated herein by reference.

BACKGROUND

The present disclosure relates to electronic leveling technology of a laser marker.

An automatic leveling device disclosed in Japanese Patent Publication No. 3082052 includes a base, a laser optical source, a tilt table that supports the laser optical source and is tiltably supported by the base, a bubble tube sensor that detects a degree of a tilt of the tilt table, and a tilt mechanism that adjusts the tilt of the tilt table such that a sensor detection value and a reference value coincide with each other. The reference value is a sensor detection value in a case where the tilt table is placed in a horizontal state, which is perpendicular to a gravity direction. Such a configuration enables the aforementioned automatic leveling device to keep the tilt table horizontally placed even when the base is placed on a slope and to apply a laser line with an accurate reference.

SUMMARY

Upper floors of multistory buildings always experience building vibration. Thus, according to an automatic leveling device placed in an upper floor of a multistory building, a difference between the sensor detection value and the reference value includes a difference corresponding to a tilt of the tilt table with respect to the building and a difference corresponding to a tilt of the building with respect to a gravity direction. For the reason above, if a leveling process is executed in upper floors of multistory buildings, a laser line may fail to be applied to buildings with an accurate reference and/or the leveling process may be repeatedly executed in some cases.

In one aspect of the present disclosure, it is desirable to apply a laser line with enhanced accuracy in a vibrating building.

A laser marker (or laser level, or laser line generator) according to one aspect of the present disclosure includes a supporter, a movable portion, at least one laser optical source, a tilt sensor, a first actuator, and/or a controller. The movable portion is tiltably supported by the supporter. The at least one laser optical source is provided to the movable portion and emits at least one laser line. The tilt sensor is provided to the movable portion and detects a first tilt of the movable portion with respect to the supporter. The first tilt corresponds to a tilt with respect to a first axis on a horizontal plane. Also, the tilt sensor outputs a first detection value that indicates an angle of the first tilt. The first actuator changes the first tilt of the movable portion. The controller (i) repeatedly acquires the first detection value output from the tilt sensor, to thereby (ii) acquire a first series of detection values. Further, the controller controls the first actuator such that a first center value and a first reference value coincide with each other. The first center value corresponds to a center value of the first series of detection values. The first reference value is set in advance.

According to the above laser marker, the first tilt of the movable portion is adjusted such that the first center value and the first reference value coincide with each other. Here, building vibrations are known to be in the form of sine waves that are symmetrical about a direction in which gravity acts (gravity direction). Thus, the first center value corresponds to a value of the first tilt of the movable portion when a building rests along the gravity direction. In other words, a difference between the first center value and the first reference value corresponds to a tilt of the laser marker with respect to the building. Accordingly, controlling the first actuator such that the first center value and the first reference value coincide with each other enables application of the laser line in vibrating multistory buildings with a reference having enhanced accuracy.

The controller may determine whether power supply from a main power source has just started. The controller may control the first actuator such that the first center value and the first reference value coincide with each other at least in response to a determination being made that the power supply has just started.

The above configuration allows the first actuator to be always controlled such that the first center value and the first reference value coincide with each other in response to the determination being made that the power supply has just started. Accordingly, a user can use a laser marker with the laser marker leveled if the user switches the main power switch from OFF to ON.

The controller may (i) sequentially make comparison among the first series of detection values, to thereby (ii) acquire a maximum value and a minimum value of the first series of detection values. The controller may average the maximum value and the minimum value to set an averaged value as the first center value.

Sequential comparison among detection values enables acquisition of the maximum value and the minimum value of the detection values. Also, the sequential comparison enables the averaged value between the maximum value and the minimum value to be set as the first center value.

The first series of detection values may include a first pair of detection values and a second pair of detection values. Each of the first pair of detection values and the second pair of detection values may include two detection values detected in a row. The two detection values may have zero difference therebetween. The controller may average one detection value of the first pair of detection values and one detection value of the second pair of detection values to set an averaged value as the first center value.

The above configuration enables the averaged value between the maximum value and the minimum value of the first series of detection values to be set as the first center value.

The controller may set a DC component of the first series of detection values as the first center value.

The first series of detection values indicates vibrations that are in the form of sine waves. Therefore, the DC component of the first series of detection values can be set as the first center value.

The controller may execute Fourier transformation to the first series of detection values to extract the DC component.

According to the above configuration, it is possible to extract the DC component by execution of the Fourier transformation to the first series of detection values.

The controller may execute a digital low-pass filter process to the first series of detection values to extract the DC component.

According to the above configuration, it is possible to extract the DC component of the first series of detection values by execution of the digital low-pass filter process to the first series of detection values.

The above laser marker may include a top-hold circuit and a bottom-hold circuit. The top-hold circuit stores a peak value of the first series of detection values. The bottom-hold circuit stores a bottom value of the first series of detection values. The controller may average the peak value stored in the top-hold circuit and the bottom value stored in the bottom-hold circuit to set an averaged value as the first center value.

According to the above configuration, it is possible to set the averaged value between the peak value stored in the top-hold circuit and the bottom value stored in the bottom-hold circuit as the first center value.

The above laser marker may further include a second actuator that is configured to change a second tilt of the movable portion with respect to the supporter. The second tilt corresponds to a tilt with respect to a second axis on the horizontal plane and the second axis is perpendicular to the first axis. Also, the tilt sensor may detect the second tilt and output a second detection value that indicates an angle of the second tilt. The controller may (i) repeatedly acquire the second detection value output from the tilt sensor, to thereby (ii) acquire a second series of detection values. Also, the controller may control the second actuator such that a second center value and a second reference value coincide with each other. The second center value corresponds to a center value of the second series of detection values. The second reference value is set in advance.

The tilt sensor detects the first tilt of the movable portion based on the first axis of the horizontal plane and the second tilt of the movable portion based on the second axis that is perpendicular to the first axis. Then, the first detection value and the second detection value are output. Further, the first tilt of the movable portion is adjusted by the first actuator and the second tilt of the movable portion is adjusted by the second actuator. In other words, an adjustment of the first tilt of the movable portion and an adjustment of the second tilt of the movable portion are individually executed. Accordingly, it is possible to adjust the first tilt and/or the second tilt of the movable portion with respect to the supporter with enhanced accuracy.

The above laser marker may include a first filter and a second filter. The first filter executes a first filter process to the first series of detection values. The second filter executes a second filter process to the second series of detection values. The second filter process is different from the first filter process. The controller may control the first actuator based on the first series of detection values that is filtered in the first filter process. Also, the controller may determine whether to re-execute control of the first actuator based on the first series of detection values that is filtered in the second filter process.

According to the above configuration, the first tilt is adjusted based on the first series of detection values that is filtered in the first filter process. Further, a determination is made whether the adjustment of the first tilt is re-executed based on the first series of detection values that is filtered in the second filter process. Accordingly, it is possible to use the first series of detection values that is filtered in either a filter process suitable for the adjustment of the first tilt or a filter process suitable for determination on re-execution of the adjustment.

The first filter may have a first time constant and the second filter may have a second time constant. The second time constant may be greater than the first time constant. If a forceful impact changes the first tilt and/or the second tilt of the movable portion with respect to the supporter, then it is necessary to execute a re-leveling process. However, there may be a case where the re-leveling process is executed even in response to a slight impact that does not change the first tilt and/or the second tilt of the movable portion with respect to the supporter. In this case, there may be a possibility where the re-leveling process is repeatedly executed and continues to be non-terminated. To address this possibility, the re-leveling process may be configured not to be executed unless a forceful impact is applied. Such a forceful impact or a slight impact causes, if exerted, the laser marker to vibrate in a cycle that is shorter than a building vibration cycle. Thus, determination on the execution of the re-leveling process may be based on the first series of detection values having reduced amplification in respect of a frequency component that is higher than a frequency of building vibrations so that the re-leveling process is not executed in response to the slight impact. In contrast, if the leveling process is executed, the execution may be based on the first series of detection values that is affected by the building vibrations. Accordingly, by setting the second time constant to a value greater than a value of the first time constant, it is possible to ensure responsiveness in executing the leveling process and, at the same time, to inhibit the re-leveling process from being executed in response to the slight impact.

The controller may determine to re-execute control of the first actuator in response to a filtered detection values exceeding a specified determination threshold value. The filtered detection values correspond to the first series of detection values filtered in the second filter process.

According to the above configuration, the control of the first actuator is re-executed in response to the first series of detection values, which is filtered in the second filter process, exceeding the determination threshold value. As a result, it is possible to inhibit the re-leveling process from being executed in response to the slight impact and at the same time, it is possible to execute the re-leveling process in response to the forceful impact.

The above laser marker may include a setting switch that is used to set a building vibration adaptive mode. The building vibration adaptive mode may be suitable for an area that experiences a building vibration. The area experiencing a building vibration may be, for example, an area located at or above a set height within a building. The controller may control the first actuator based on the first center value in response to the building vibration adaptive mode being set via the setting switch.

By setting the building vibration adaptive mode using the setting switch, it is possible to execute the leveling process that deals with building vibrations peculiar to multistory buildings.

The controller may repeatedly acquire the first detection value during the set time. The set time may be set to be a longer period relative to one building vibration cycle.

With the set time, which is set to have the longer period relative to the one building vibration cycle, it is possible to appropriately detect the first tilt when the building rests along the gravity direction.

Another aspect of the present disclosure is an electronic leveling method of a laser marker, the method comprising:
repeatedly detecting a tilt of a movable portion of the laser marker with respect to a supporter of the laser marker, to thereby acquire a series of detection values, the movable portion being tiltably supported by the supporter, and the movable portion including at least one laser optical source;

calculating a center value of the acquired series of detection values; and/or controlling at least one actuator included in the laser marker such that the calculated center value and a specified reference value coincide with each other, the at least one actuator being configured to change the tilt of the movable portion.

In the another aspect of the present disclosure, the same effect is exhibited as in the above laser marker.

BRIEF DESCRIPTION OF THE DRAWINGS

An embodiment of the present disclosure will be described hereinafter by way of example with reference to the accompanying drawings, in which.

DETAILED DESCRIPTION OF EXEMPLARY EMBODIMENTS

<1. Configuration>
<1-1. Overall Configuration>

Figure 1:
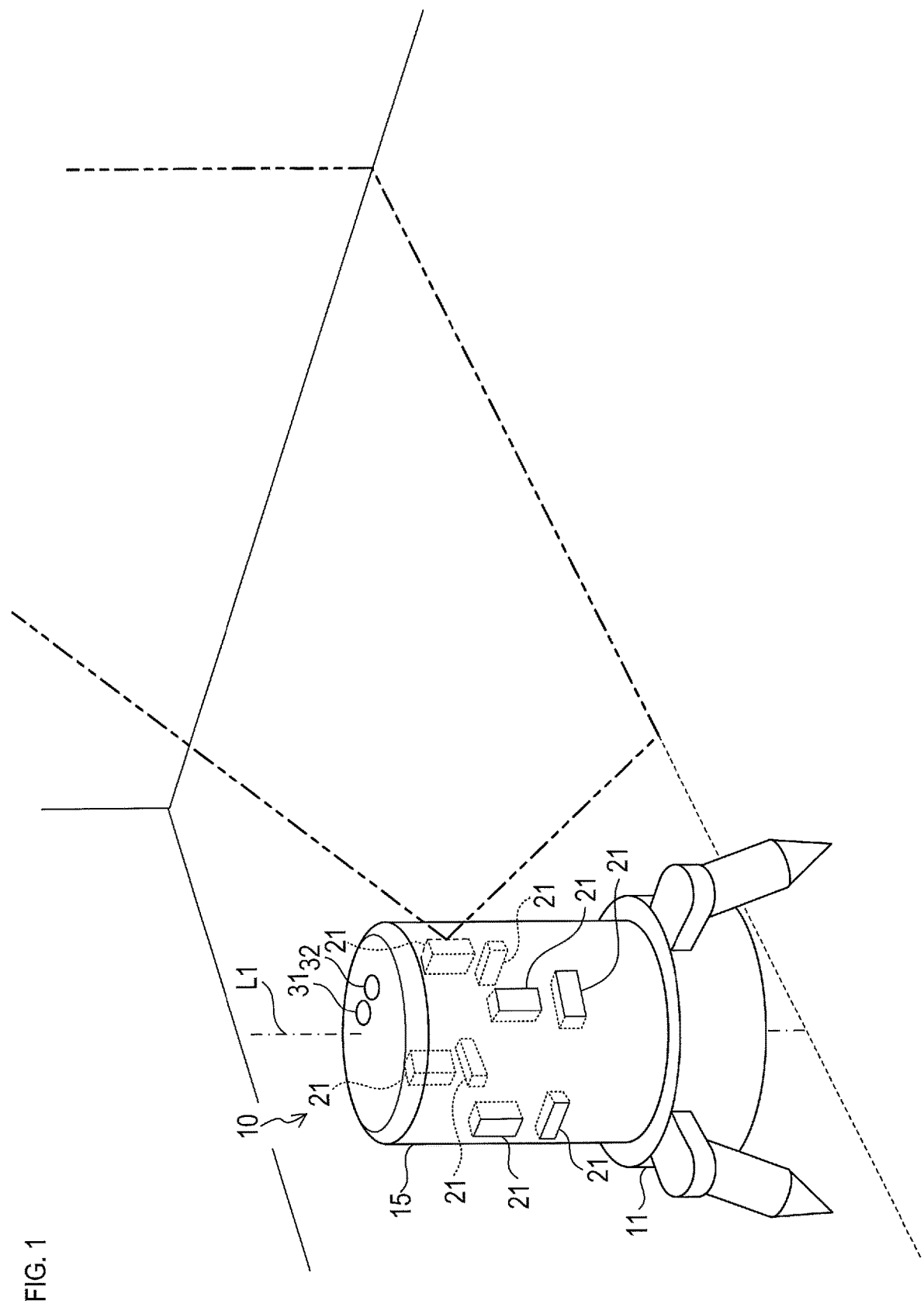
FIG. 1 is a diagram showing an exterior appearance of a laser marker.

First of all, descriptions are given to an overall configuration of a laser marker 10 with reference to FIGS. 1 to 5. As shown in FIG. 1, the laser marker 10 is placed on a placement surface (for example, a floor) via a leg part 11 that includes three legs. On the leg part 11, a cover 15 with an upper surface is attached and the cover 15 has a cylindrical shape.

The upper surface of the cover 15 is provided with a main power switch 31 and a building vibration adaptive mode switch 32. The main power switch 31 is manipulated to supply electric power to the laser marker 10 from a power source such as a battery. The building vibration adaptive mode switch 32 is manipulated to set a building vibration adaptive mode leveling. The building vibration adaptive mode leveling is suitable for an area at or above a set height within a building. In a case where the building vibration adaptive mode leveling is set, a leveling process, which is suitable for an environment causing building vibrations, is executed unlike a normal leveling.

Also, the cover 15 is provided with, in a side surface thereof, emission windows 21. In the present embodiment, the emission windows 21, which are eight in number, are provided in two stages separated in up-down directions. Each stage in the up-down directions is provided with the emission windows 21, which are four in number, in a circumferential direction of the cover 15. The cover 15 is provided therein with laser diodes 20. Laser lights generated by the laser diodes 20 are emitted outward through the emission windows 21. This allows a vertical laser light or a horizontal laser light to be emitted outward. The vertical laser light and the horizontal laser light, respectively, indicate a reference line in a vertical direction and a reference line in a horizontal direction.

Figure 2:
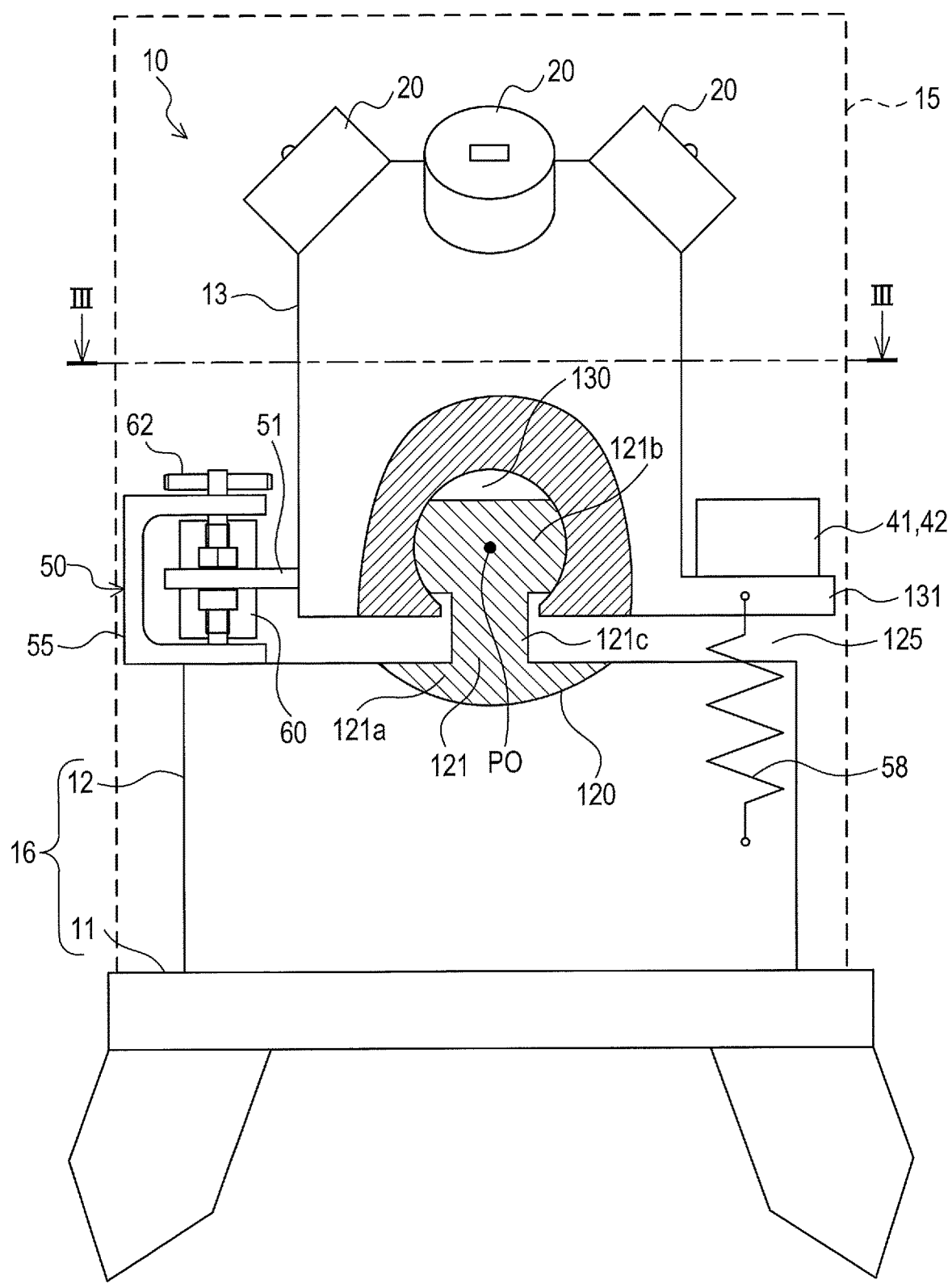
FIG. 2 is a schematic view showing an internal configuration of the laser marker.
Figure 3:
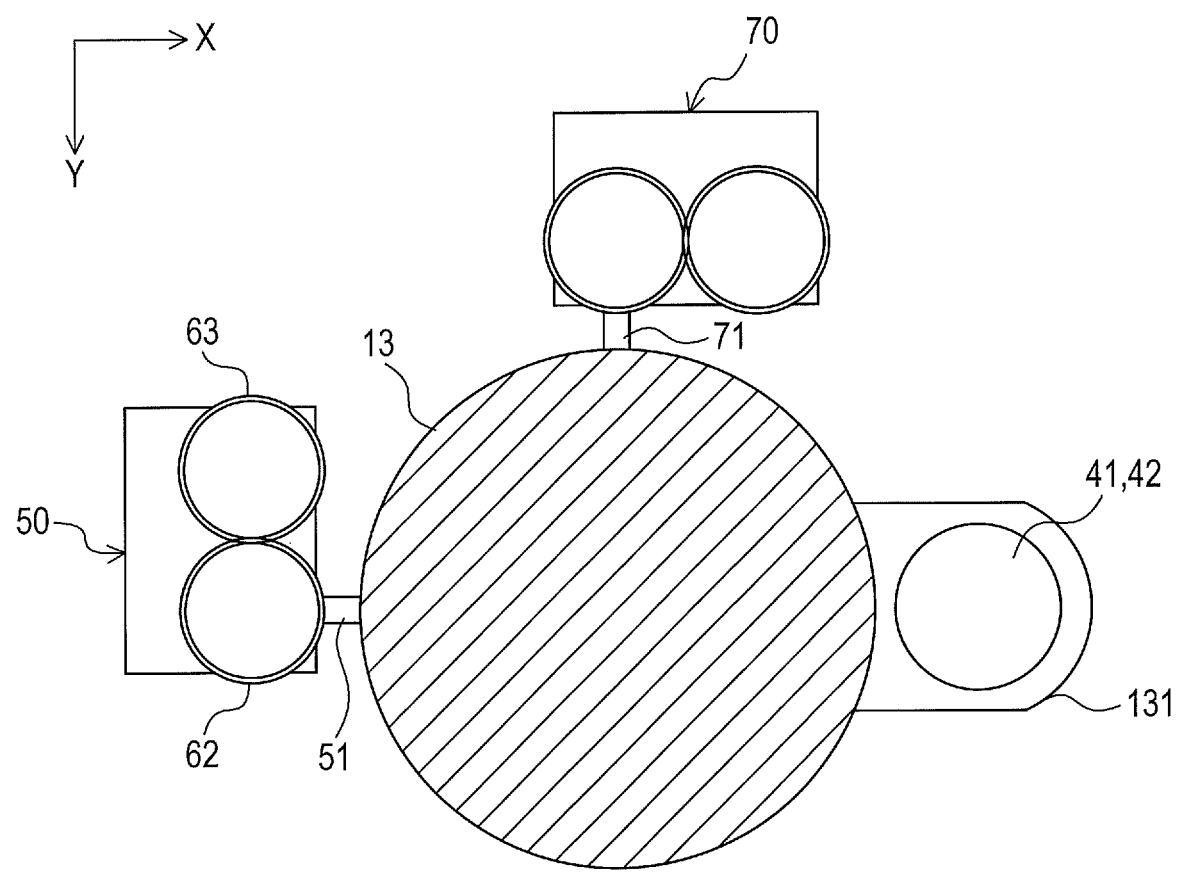
FIG. 3 is a diagram showing a horizontal section along a line III-III of FIG. 2.
Figure 4:
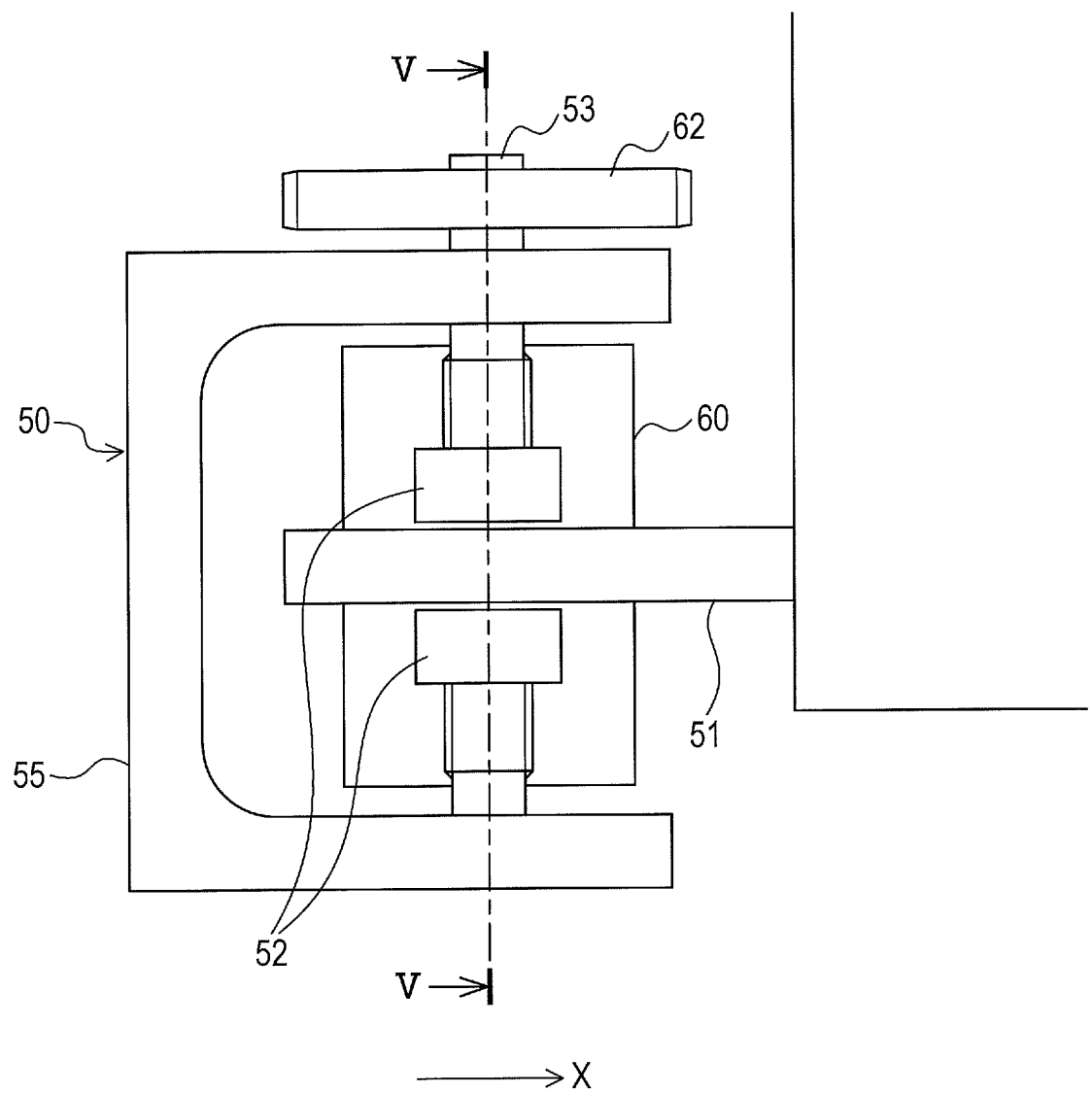
FIG. 4 is a schematic view that enlarges an area around and including an X-axis motor of the laser marker.
Figure 5:
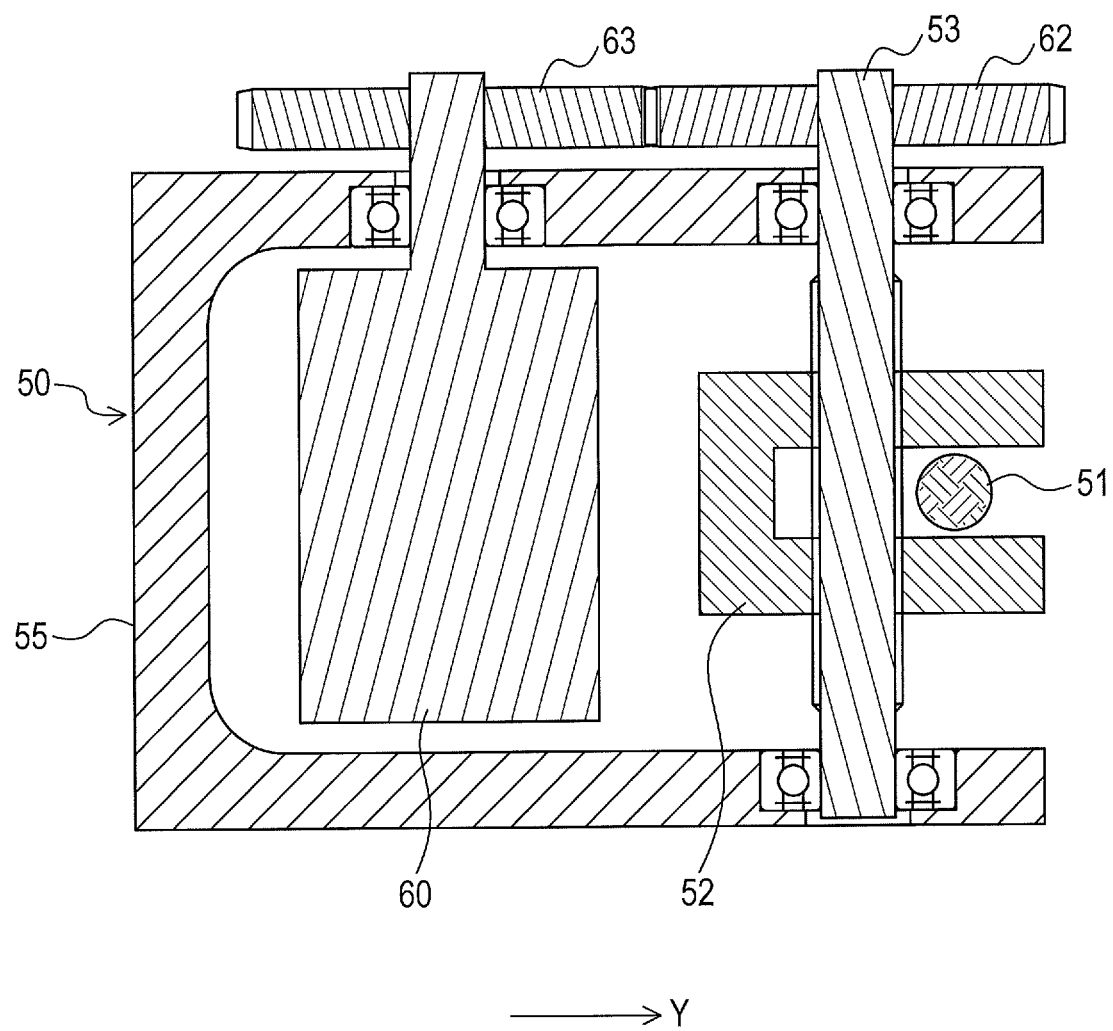
FIG. 5 is a vertical sectional view along a line V-V of FIG. 4.

FIGS. 2 to 5 show that the cover 15 is removed from the laser marker 10. The laser marker 10 includes a supporter 16, a movable portion 13, a coupling member 121, an X-axis adjustor 50, a Y-axis adjustor 70, an X-axis tilt sensor 41, and a Y-axis tilt sensor 42. A side view of FIG. 2 shows a vertical section only in respect of a coupling portion between the supporter 16 and the movable portion 13. Here, in the present embodiment, a direction, in which gravity acts, is the gravity direction and a surface that is perpendicular to the gravity direction is a horizontal plane. And, two axes of the horizontal plane, which are perpendicular to each other, are an X-axis and a Y-axis.

The supporter 16 includes the leg part 11 and a base table 12 that is provided on the leg part 11 and has a columnar shape. The base table 12 is provided with, in the center of an upper surface thereof, a supporter-side fitting hole 120.

The movable portion 13 is formed to have a cylindrical shape and includes the laser diodes 20, which are four in number (only three of the four laser diodes 20 are illustrated). Each laser diode 20 is a laser optical source that generates a laser light. The laser optical source may be, instead of the laser diode, a semiconductor laser, a gas laser, a solid-state laser, or other type of lasers. The movable portion 13 also includes an extending portion 131 that has a plate shape and extends from a bottom part of the movable portion 13 in the X-axis direction. Further, the movable portion 13 is provided with, in the center of a bottom surface thereof, a movable portion-side fitting hole 130 that is formed in a spherical shape.

The coupling member 121 couples the base table 12 and the movable portion 13 together. The coupling member 121 is formed to have an approximately H-shape section along the vertical section. And, the coupling member 121 includes a lower portion 121a, an upper portion 121b, and an intermediate portion 121c that couples the lower portion 121a and the upper portion 121b together.

The lower portion 121a is fitted into the supporter-side fitting hole 120 to be fixed to the supporter-side fitting hole 120. The upper portion 121b is fitted into the movable portion-side fitting hole 130 in a manner that allows the movable portion 13 to tilt. The bottom surface of the movable portion 13 and the upper surface of the base table 12 have a gap 125 formed therebetween. The gap 125 corresponds to a length of the intermediate portion 121c. This allows the movable portion 13 to be supported such that the movable portion 13 can tilt about a center PO of the upper portion 121b with respect to the supporter 16.

The X-axis tilt sensor 41 and the Y-axis tilt sensor 42 are configured as one integral sensor and are placed on the extending portion 131. The extending portion 131 is coupled to a side surface of the base table 12 via a spring 58. The X-axis tilt sensor 41 is, for example, a bubble tube sensor in which a fluid including bubbles is filled. In accordance with a position of the bubbles, the X-axis tilt sensor 41 detects a tilt of the movable portion 13 based on the X-axis, in other words, a tilt of the movable portion 13 with respect to the X-axis (hereinafter, referred to as an X-axis tilt). Similarly, the Y-axis tilt sensor 42 detects a tilt of the movable portion 13 based on the Y-axis, in other words, a tilt of the movable portion 13 with respect to the Y-axis (hereinafter, referred to as a Y-axis tilt).

The X-axis adjustor 50 is disposed opposite to the extending portion 131 in the X-axis direction, in other words, disposed in a position apart from the extending portion 131 by 180 degrees. The Y-axis adjustor 70 is disposed in a position apart from the X-axis adjustor 50 and the extending portion 131 by 90 degrees along the Y-axis direction.

The X-axis adjustor 50 includes an X-axis motor 60, an X-axis coupling member 51, a U-shaped member 52, a screw axis 53, an attaching member 55, a first gear 63, and a second gear 62.

The attaching member 55 has a shape of a square hollow body that extends in the Y-axis direction. And, the attaching member 55 opens toward the movable portion 13. A bottom portion of the attaching member 55 is fixed to the upper surface of the base table 12.

The X-axis motor 60 is arranged inside the attaching member 55 and a rotation shaft of the X-axis motor 60 protrudes out of an upper surface of the attaching member 55. The X-axis motor 60 is an actuator that changes the X-axis tilt. The first gear 63 is attached to the rotation shaft of the X-axis motor 60 that protrudes out of the upper surface of the attaching member 55.

The screw axis 53 includes a lower end and an upper end. The lower end is fixed to a bottom surface of the attaching member 55 and the upper end protrudes out of the upper surface of the attaching member 55. The second gear 62 is attached to the screw axis 53 that protrudes out of the upper surface of the attaching member 55. The first gear 63 and the second gear 62 are arranged so that respective gear teeth of the first gear 63 and the second gear 62 mesh with each other.

The U-shaped member 52 is arranged inside the attaching member 55 and is attached to the screw axis 53. Specifically, the screw axis 53 penetrates through two plate-shaped portions of the U-shaped member 52 that face each other. The U-shaped member 52 moves in the up-down directions along the screw axis 53 in response to rotation of the second gear 62.

The X-axis coupling member 51 is a stick-shaped member. The X-axis coupling member 51 includes a first end that extends in the X-axis direction and is fixed to a side surface of the movable portion 13. And, the X-axis coupling member 51 includes a second end that is interposed between the two plate-shaped portions of the U-shaped member 52.

In response to the X-axis motor 60 being driven, a driving force of the X-axis motor 60 is transmitted to the second gear 62 via the first gear 63. Then, the U-shaped member 52 moves in the up-down directions. Movement of the U-shaped member 52 in the up-down directions changes a position of the second end of the X-axis coupling member 51 in the up-down directions. In response to this, the X-axis tilt changes.

The Y-axis adjustor 70 includes a Y-axis motor 80, a Y-axis coupling member 71, and the like. And, the Y-axis adjustor 70 has the same configuration as with the X-axis adjustor 50. The Y-axis motor 80 is an actuator that changes the Y-axis tilt.

<1-2. Electrical Configuration>

Figure 6:
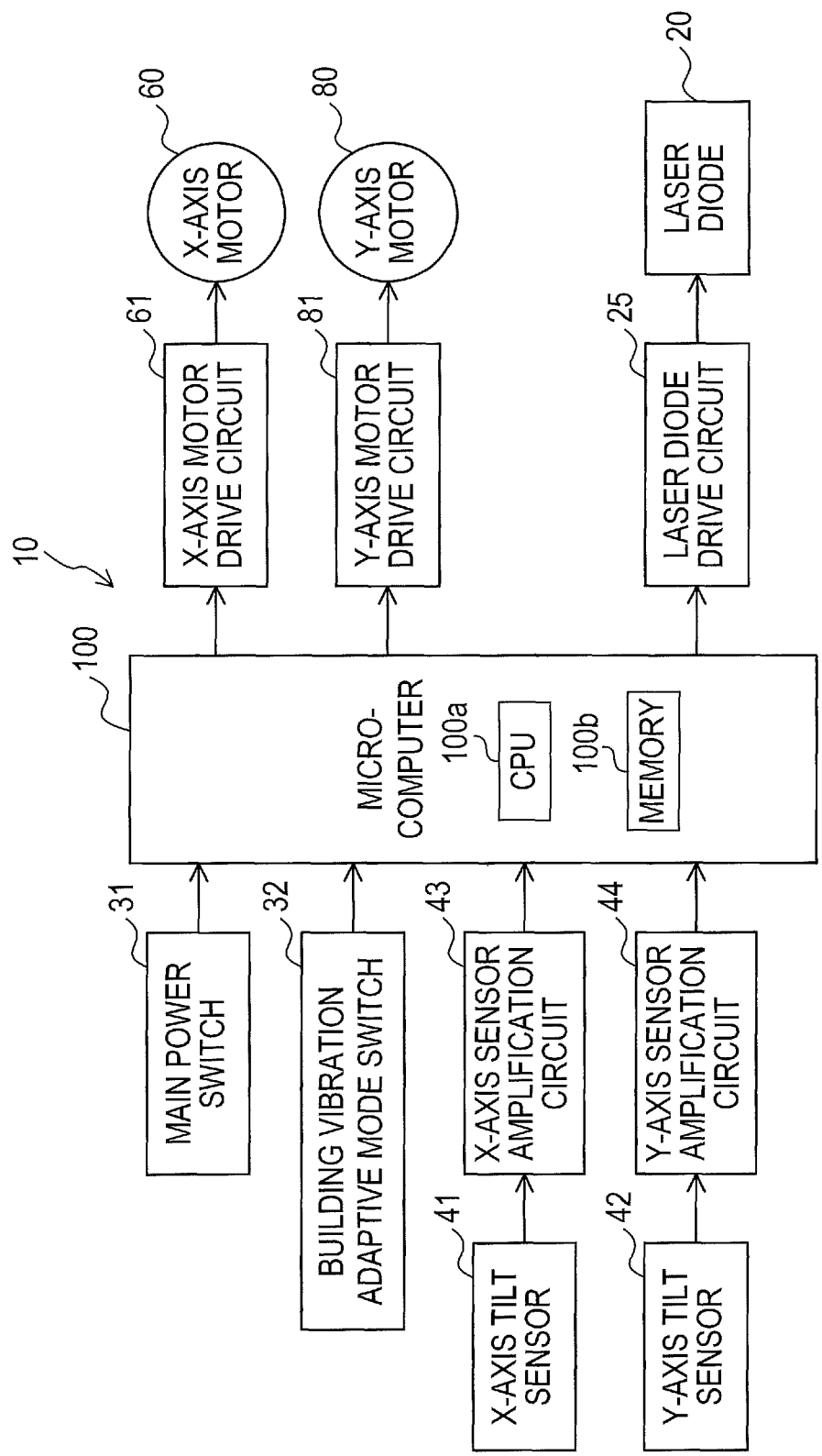
FIG. 6 is a block diagram showing a functional configuration of the laser marker.

Next, descriptions are given to an electrical configuration of the laser marker 10 with reference to FIG. 6. The laser marker 10 includes a microcomputer 100 that includes a CPU 100a, a memory 100b and an I/O, and the like.

Further, the laser marker 10 includes, in an input of the microcomputer 100, the main power switch 31, the building vibration adaptive mode switch 32, the X-axis tilt sensor 41, an X-axis sensor amplification circuit 43, the Y-axis tilt sensor 42, and a Y-axis sensor amplification circuit 44.

The laser marker 10 also includes, in an output of the microcomputer 100, an X-axis motor drive circuit 61, the X-axis motor 60, a Y-axis motor drive circuit 81, the Y-axis motor 80, a laser diode drive circuit 25, and the laser diodes 20.

The main power switch 31 is used to supply a power to the microcomputer 100 and other circuits. In response to the main power switch 31 being pressed, the power is supplied from a battery (not shown) to the microcomputer 100 and other circuits.

The building vibration adaptive mode switch 32 is used to set a building vibration adaptive mode as a leveling process. In response to the building vibration adaptive mode switch 32 being pressed, the building vibration adaptive mode is set. In response to the building vibration adaptive mode being set, the microcomputer 100 executes the leveling process in the building vibration adaptive mode, which is alternative to a default leveling process, as the leveling process of the laser marker 10. The leveling process in the building vibration adaptive mode will be described below in detail.

The X-axis tilt sensor 41 detects an angle of the X-axis tilt and then outputs a series of X-axis detection values to the X-axis sensor amplification circuit 43. Each X-axis detection value indicates the angle of the X-axis tilt. The X-axis detection value is indicated, for example, by a value that falls within a range of 0 to 3.3 V. If the movable portion 13 is not tilted, then the X-axis detection value is indicated as 1.65 V. Similarly, the Y-axis tilt sensor 42 detects an angle of the Y-axis tilt and then outputs a series of Y-axis detection values to the Y-axis sensor amplification circuit 44. Each Y-axis detection value indicates the angle of the Y-axis tilt.

Figure 7:
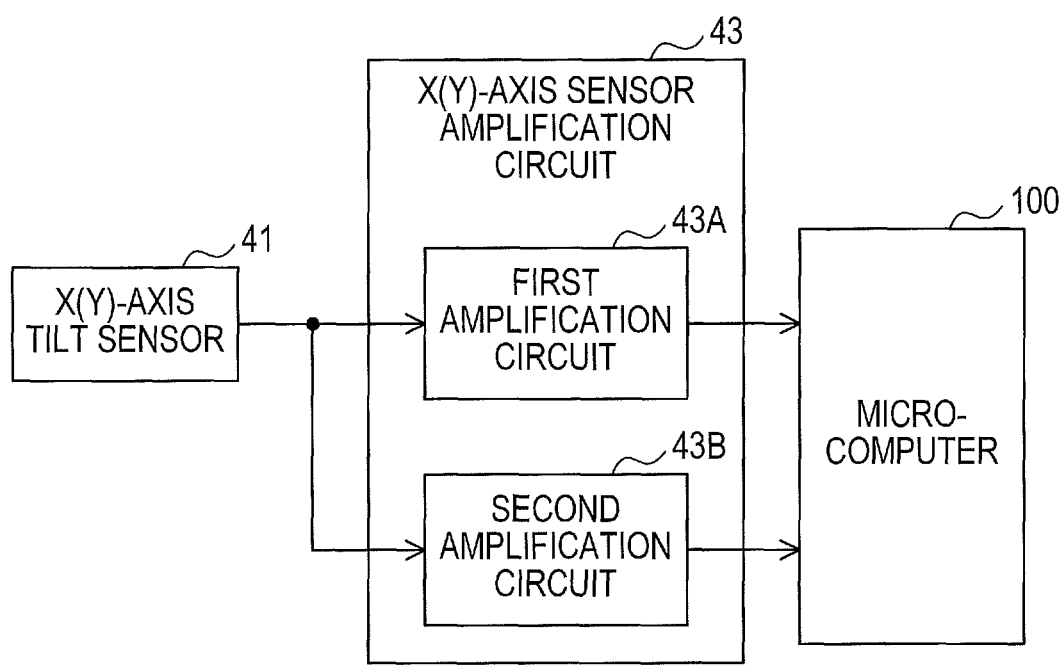
FIG. 7 is a view showing a configuration of an X-axis sensor amplification circuit.

As shown in FIG. 7, the X-axis sensor amplification circuit 43 includes a first amplification circuit 43A and a second amplification circuit 43B. The first amplification circuit 43A executes a first filter process and then outputs first X-axis detection values, which are filtered in the first filter process, to microcomputer 100. The second amplification circuit 43B executes a second filter process and then outputs second X-axis detection values, which are filtered in the second filter process, to the microcomputer 100. A time constant T2 of the second filter process is set to have a greater value than a value of a time constant T1 of the first filter process. For example, the time constant T1 is set to have a value that corresponds to an interrupt frequency of on the order of several Hertz (Hz), which is smaller than a building vibration cycle. The time constant T2 is set to have a value that corresponds to an interrupt frequency of on the order of 0.1 Hz.

The Y-axis sensor amplification circuit 44 is configured in the same manner as the X-axis sensor amplification circuit 43 and therefore, descriptions of the Y-axis sensor amplification circuit 44 are omitted. As in the X-axis sensor amplification circuit 43, the Y-axis sensor amplification circuit 44 outputs first Y-axis detection values and second Y-axis detection values to the microcomputer 100, the first Y-axis detection values and the second Y-axis detection values being filtered in the first filter process and in the second filter process respectively.

The microcomputer 100 achieves functions by such a manner that the CPU 100a executes various programs that are stored in the memory 100b. Specifically, the microcomputer 100 executes the leveling process based on the series of X-axis detection values and the series of Y-axis detection values. Then, the microcomputer 100 generates a drive signal for the X-axis motor drive circuit 61 and a drive signal for the Y-axis motor drive circuit 81. In response to an end of the leveling process, the microcomputer 100 generates a drive signal for the laser diode drive circuit 25.

The X-axis motor 60 and the Y-axis motor 80 each are, for example, a DC brush motor. The X-axis motor drive circuit 61 is a H-bridge circuit that drives the X-axis motor 60. The X-axis motor drive circuit 61 controls a drive current flowing through the X-axis motor 60 based on the drive signal output from the microcomputer 100. Similarly, the Y-axis motor drive circuit 81 controls a drive current flowing through the Y-axis motor 80 based on the drive signal output from the microcomputer 100. Here, the X-axis motor 60 and the Y-axis motor 80 each may be a three-phase brushless motor.

The laser diode drive circuit 25 causes the laser diode 20 to emit the laser light based on the drive signal output from the microcomputer 100. The laser light is emitted in a lighting cycle that is based on the drive signal for the laser diode drive circuit 25.

<2. Process>
<2-1. Leveling Process>

Figure 8:
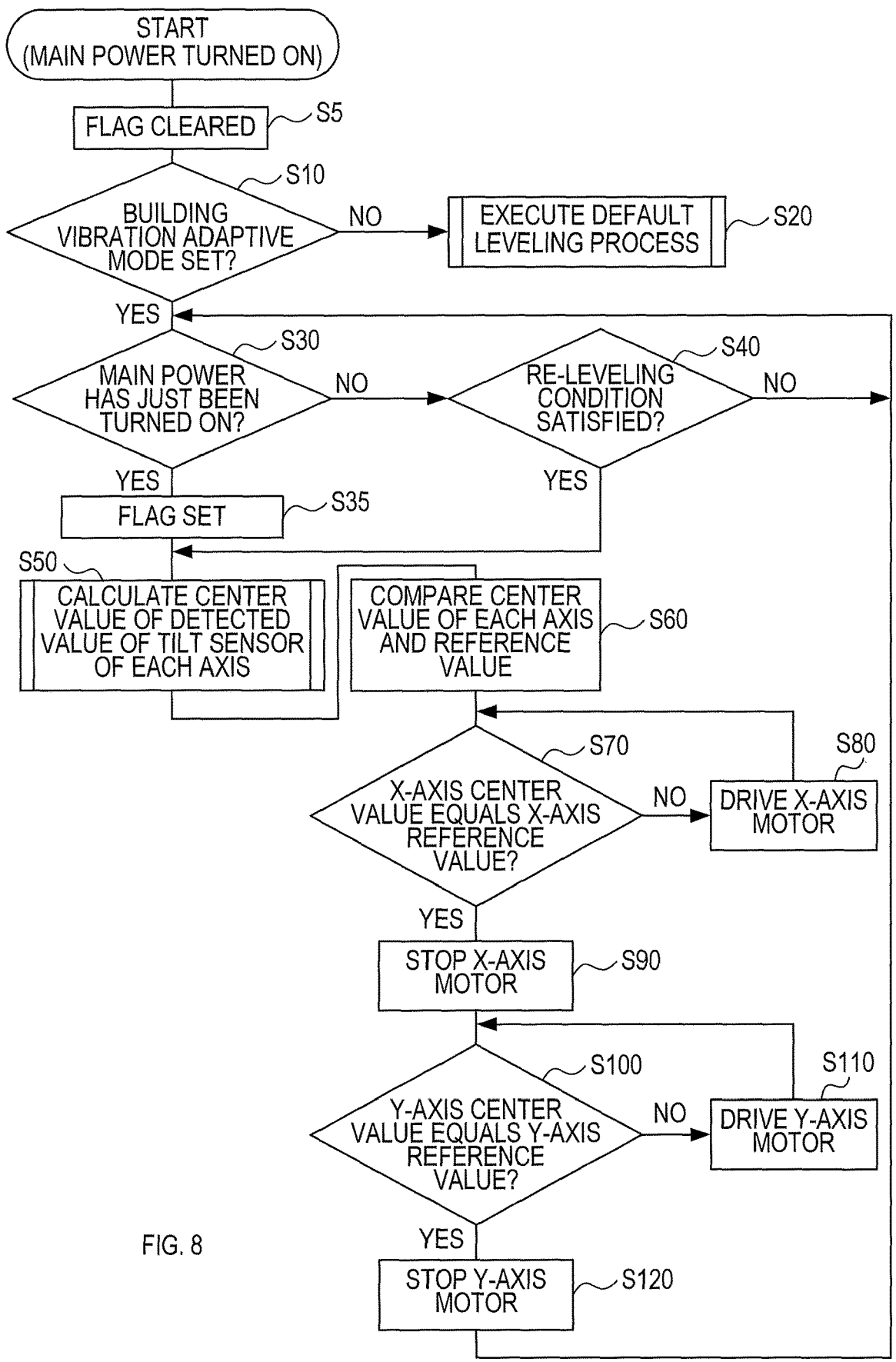
FIG. 8 is a flowchart showing a process of a leveling process.

Next, descriptions are given to processes of the leveling process executed by the microcomputer 100 with reference to the flowchart of FIG. 8. The microcomputer 100 starts executing the leveling process in response to the main power switch 31 being pressed to be switched ON from OFF.

First of all, S5 clears a determination flag that is used to determine whether the main power switch 31 has just been turned ON. Specifically, the determination flag is set to be "0".

Then, in S10 the microcomputer 100 determines whether the building vibration adaptive mode is set, in other words, whether the building vibration adaptive mode switch 32 is pressed to be in a ON-state. If the building vibration adaptive mode is set, then the leveling process proceeds to a process in S30, where the leveling process is executed in the building vibration adaptive mode. If the building vibration adaptive mode is not set, however, then the leveling process proceeds to a process in S20, where the default leveling process is executed.

In S30, the microcomputer 100 determines whether the main power switch 31 has just been turned ON based on the determination flag. Specifically, if the determination flag is "0", then the microcomputer 100 determines that the main power switch 31 has just been turned ON. If the determination flag shows a value other than "0"(specifically, "1"), then the microcomputer 100 determines that the main power switch 31 has not just been turned ON. If the microcomputer 100 determines that the main power switch 31 has just been turned ON, then the leveling process proceeds to a process in S35. If the microcomputer 100 determines that the main power switch 31 has not just been turned ON, however, then the leveling process proceeds to a process in S40.

In S35, the microcomputer 100 sets the determination flag. In other words, the microcomputer 100 sets the determination flag to "1". This setting allows the process in S30 to determine that the main power switch 31 has not just been turned ON in a case where the leveling process returns to the process in S30 subsequent to a process in S120 described below. In response to an end of the process in S35, the leveling process proceeds to a process in S50.

In S50, the microcomputer 100 detects an X-axis center value and a Y-axis center value. The X-axis center value is a center value of the series of X-axis detection values detected during a set time Ta. The Y-axis center value is a center value of the series of Y-axis detection values detected during the set time Ta. Respective detection processes of the X-axis center value and the Y-axis center value are described below in detail.

Then, the leveling process proceeds to S60, where the X-axis center value and an X-axis reference value are compared with each other, and the Y-axis center value and a Y-axis reference value are compared with each other. The X-axis reference value and the Y-axis reference value are set in advance and these values correspond to values when the extending portion 131 is horizontal.

Then, in S60, the microcomputer 100 generates the drive signal for the X-axis motor 60 such that a difference between the X-axis center value and the X-axis reference value becomes zero. And, the microcomputer 100 generates the drive signal for the Y-axis motor 80 such that a difference between the Y-axis center value and the Y-axis reference value becomes zero.

Then, the leveling process proceeds to S70, where a determination is made whether the X-axis center value and the X-axis reference value coincide with each other. If the microcomputer 100 determines that the X-axis center value and X-axis reference value do not coincide with each other, then the leveling process proceeds to S80, where the drive signal is output to the X-axis motor drive circuit 61 to drive the X-axis motor 60. In contrast, if the microcomputer 100 determines that the X-axis center value and the X-axis reference value coincide with each other, then the leveling process proceeds to S90, where a stop signal is output to the X-axis motor drive circuit 61 to stop the X-axis motor 60.

Then, the leveling process proceeds to S100, where a determination is made whether the Y-axis center value and the Y-axis reference value coincide with each other. If the microcomputer 100 determines that the Y-axis center value and the Y-axis reference value do not coincide with each other, then the leveling process proceeds to S110, where the drive signal is output to the Y-axis motor drive circuit 81 to drive the Y-axis motor 80. In contrast, if the microcomputer 100 determines that the Y-axis center value and the Y-axis reference value coincide with each other, then the leveling process proceeds to S120, where a stop signal is output to the Y-axis motor drive circuit 81 to stop the Y-axis motor 80. Here, respective processes in S70 to S90 and respective processes in S100 to S120 may be executed concurrently.

Further, if, in S30, the microcomputer 100 determines that the main power switch 31 has not just been turned ON, then the leveling process proceeds to S40, where a determination is made whether a re-leveling condition is satisfied. Here, the movable portion 13 is loosely attached to the base table 12. Due to this loose attachment, if an external object contacts the laser marker 10 and/or the placement surface of the laser marker 10 is forcefully impacted, then the tilt of the movable portion 13 with respect to the base table 12 changes. Thus, the leveling process is required to be executed again.

There may be a case where the re-leveling condition is set such that a re-leveling process is executed even in response to a slight impact on the laser marker 10 and/or the placement surface thereof. In this case, the leveling process may be repeatedly executed and continue to be non-terminated. To address this, in the present embodiment, the re-leveling condition is set such that the re-leveling process is not executed unless a forceful impact is exerted on the laser marker 10 and/or the placement surface thereof.

The forceful impact or the slight impact generates, if exerted, a vibration having a cycle that is shorter than the building vibration cycle. In determining whether the re-leveling condition is satisfied, the second X-axis detection values and the second Y-axis detection values, which are filtered in the second filter process, are used to determine whether the re-leveling condition is satisfied. The time constant T2 of the second filter process is greater than the time constant T1 of the first filter process. Therefore, the second X-axis detection values and the second Y-axis detection values each have a reduced amplification in respect of a frequency component having a cycle that is shorter than the building vibration cycle (in other words, a frequency component that is higher than a frequency of the building vibrations).

The re-leveling condition is determined to be satisfied in response to the second X-axis detection values with the reduced amplification exceeding a specified determination threshold value and/or in response to the second Y-axis detection values with the reduced amplification exceeding a specified determination threshold value. In the case of exertion of the slight impact, the second X-axis detection values with the reduced amplification and/or the second Y-axis detection values with the reduced amplification do not exceed the determination threshold value. In the case of exertion of the forceful impact, however, the second X-axis detection values and/or the second Y-axis detection values exceed the determination threshold value even if the amplification is reduced. In response to the microcomputer 100 determining that the re-leveling condition is satisfied in S40, the leveling process proceeds to a process in S50. In response to the microcomputer 100 determining that the re-leveling condition is unsatisfied in S40, the leveling process proceeds to the process in S30.

Further, in response to the microcomputer 100 determining that the building vibration adaptive mode is not selected in S10, the leveling process proceeds to S20, where the default leveling process is executed. In the default leveling process, the X-axis motor 60 is driven such that the X-axis detection value and the X-axis reference value coincide with each other and the Y-axis motor 80 is driven such that the Y-axis detection value and the Y-axis reference value coincide with each other.

<2-2. Center Value Detection Process>

Next, descriptions are given one by one to five methods for the center value detection process. The respective detection processes of the X-axis center value and the Y-axis center value are the same and therefore, descriptions are given to the detection process of the X-axis center value (center value) below and descriptions of the detection process of the Y-axis center value are omitted.

<2-2-1. Hill Climbing and Gradient Descent Methods>

Figure 9:
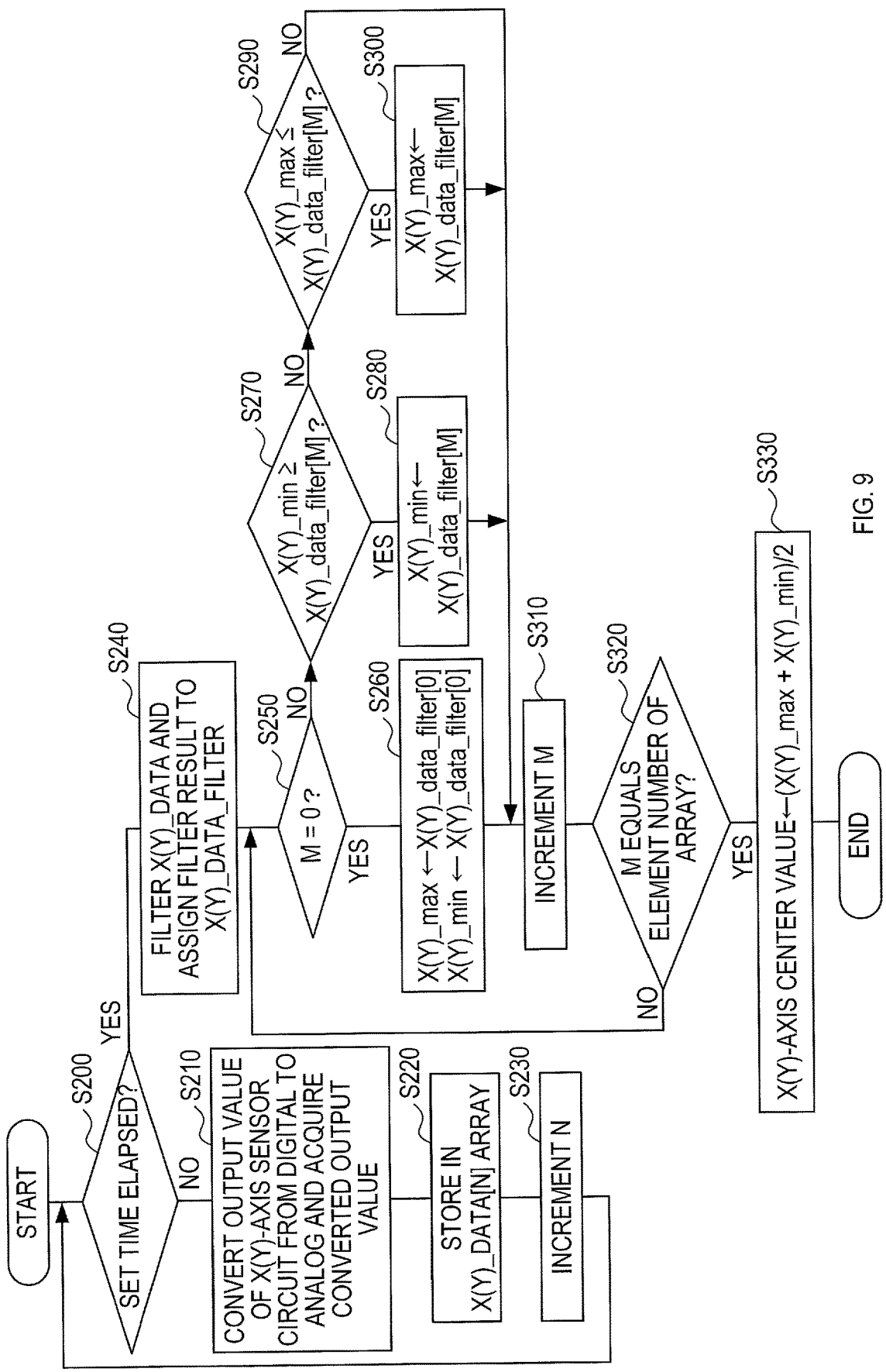
FIG. 9 is a flowchart showing a process to detect a center value by a hill climbing method and a gradient descent method.

Here, descriptions are given to the center value detection process using hill climbing and gradient descent methods with reference to the flowchart of FIG. 9.

First of all, S200 determines whether the set time Ta elapses after a start of acquisition of the series of X-axis detection values. In order to acquire the center value of the series of X-axis detection values, which changes due to the building vibrations, it is necessary to use the series of X-axis detection values that is detected over a period of time that is longer relative to one building vibration cycle. Thus, the set time Ta is set to have a period of time that is longer relative to the one building vibration cycle. The building vibration cycle is, for example, about 2 to 5 seconds. In view of this, the set time Ta is preferably set to be about 10 seconds. If the microcomputer 100 determines that the set time Ta does not elapse in S200, then the center value detection process proceeds to a process in S210.

In S210, the microcomputer 100 converts the series of X-axis detection values, which is detected by the X-axis tilt sensor 41, from analog to digital and acquires the series of converted X-axis detection values. The series of acquired X-axis detection values is detection values that are filtered in the first filter process (the first X-axis detection values). The first filter process has a smaller time constant and enhanced responsiveness relative to the second filter process.

Specifically, the time constant T1 of the first filter process is set to have a value that can respond to a change in detection value due to the building vibrations.

Then, the center value detection process proceeds to S220, where the series of X-axis detection values acquired in S210 is stored in an X_data[N] array. The alphabet N stands for a variable that indicates an element number of an X_data array. The initial value of the variable N is 0.

Then, the center value detection process proceeds to S230, where the variable N is counted up and the center value detection process returns to a process in S200.

In contrast, if the microcomputer 100 determines that the set time Ta elapses in S200, then the center value detection process proceeds to a process in S240. In S240, the microcomputer 100 executes a filter process, such as moving-average or the like, to the X_data array in order to eliminate a high frequency component caused by impacts, walking vibrations, or the like. Then, the microcomputer 100 assigns a result of the filter process to an X_data_filter array.

Then, the center value detection process proceeds to S250, where a determination is made whether a variable M is 0. The alphabet M stands for a variable that indicates an element number of the X_data_filter array. The initial value of the variable M is 0. If the variable M is 0, then the center value detection process proceeds to a process in S260.

In S260, the microcomputer 100 assigns a value of X_data_filter[0] to a variable X_max and a variable X_min. The variable X_max and the variable X_min are variables for a maximum value and a minimum value, respectively. Then, the center value detection process proceeds to a process in S310.

In contrast, if the variable M is a value other than 0 in S250, the center value detection process proceeds to a process in S270. In S270, the microcomputer 100 determines whether the value of the variable X_min is equal to or more than a value of an X_data_filter[M] array. If the value of the variable X_min is equal to or more than the value of the X_data_filter[M] array, the center value detection process proceeds to a process in S280, where the value of the X_data_filter[M] is assigned to the variable X_min. Then, the center value detection process proceeds to a process in S310.

Further, if the value of the variable X_min is less than the value of the X_data_filter[M] array in S270, then the center value detection process proceeds to S290. In S290, the microcomputer 100 determines whether the value of the variable X_max is equal to or less than the value of the X_data_filter[M] array. If the value of the variable X_max is equal to or less than the value of the X_data_filter[M] array, then the center value detection process proceeds to S300, where the value of the X_data_filter[M] array is assigned to the value of the variable X_max. Then, the center value detection process proceeds to S310.

If the value of the variable X_max is greater than the value of the X_data_filter[M] array in S290, the center value detection process proceeds to S310, where the variable M is counted up (or incremented).

Then, the center value detection process proceeds to S320, where a determination is made whether the value of the variable M is equal to the element number of the X_data_filter array. If the value of the variable M is smaller than the element number of the X_data_filter array, then the center value detection process returns to a process in S250 to repeat respective proceeses in S250 to S300. Specifically, the series of X-axis detection values detected during the set time Ta is sequentially compared with each other so that the maximum value and the minimum value of the series of X-axis detection values is acquired.

Further, if the value of the variable M is equal to the element number of the X_data_filter array, in other words, if comparison among the series of X-axis detection values ends, then the center value detection process proceeds to a process in S330.

In S330, the microcomputer 100 calculates the X-axis center value. The varable X_max is assigned with a maximum value of the array X_data_filter array. The variable X_min is assigned with a minimum value of the X_data_filter array. Therefore, an averaged value between the variable X_max and the variable X_min is calculated as the X-axis center value. Then, the present center value detection process using the hill climbing and the gradient descent methods ends.

<2-2-2. Differential Calculus>

Figure 10:
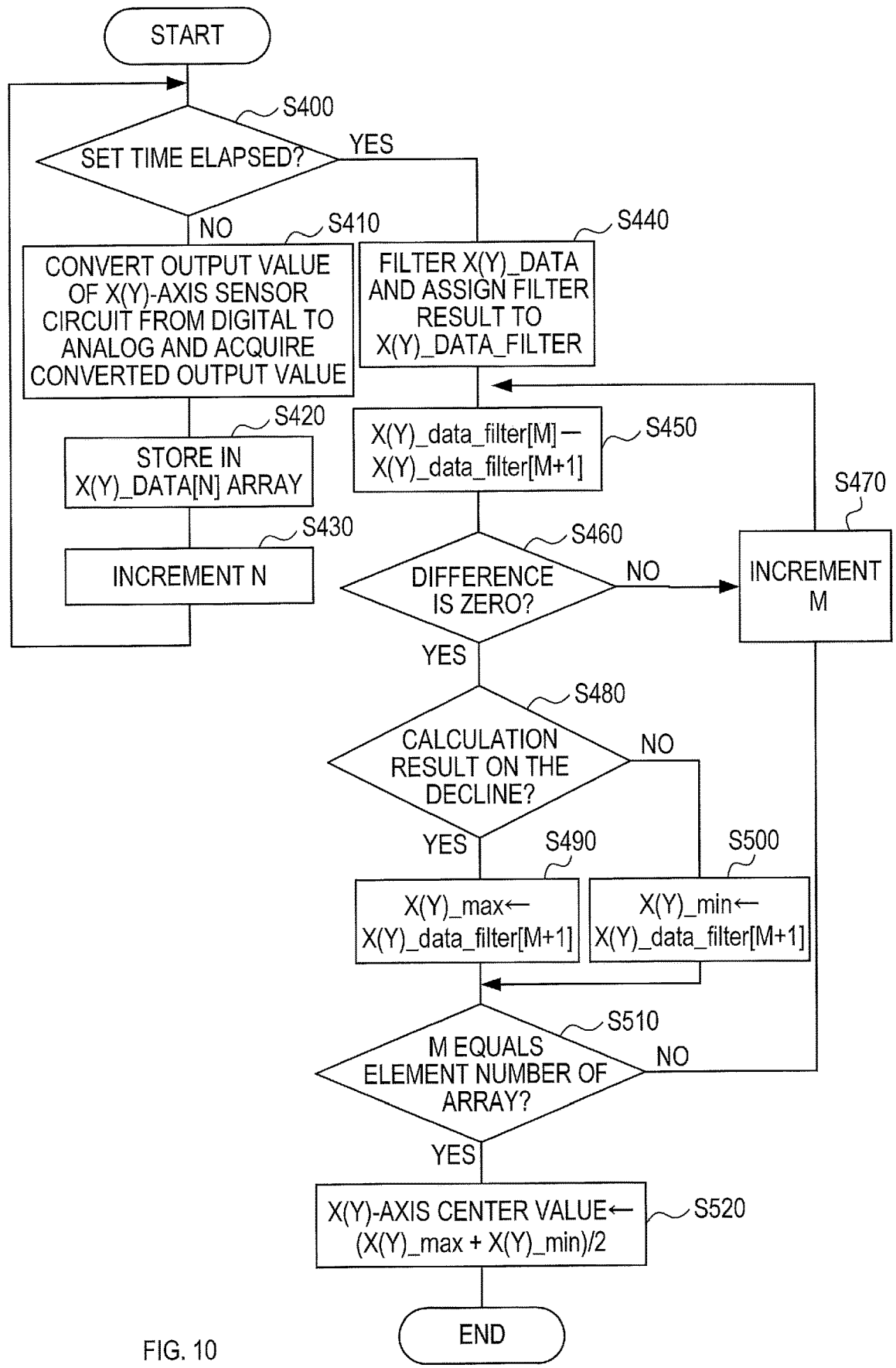
FIG. 10 is a flowchart showing a process to detect the center value by differential calculus.

Next, descriptions are given to a center value detection process using differential calculus with reference to the flowchart of FIG. 10.

First of all, S400 to S440 execute the same processes in S200 to S240.

Then, the center value detection process proceeds to S450, where a difference between a Mth element of the X_data_filter array and a (M+1)th element of the X_data_filter array is calculated. Specifically, a value of an X_data_filter[M+1] is subtracted from a value of the X_data_filter[M] so that the difference is calculated.

Then, the center value detection process proceeds to S460, where a determination is made whether the difference calculated in S450 is zero. If the difference is a value other than zero, then the center value detection process proceeds to S470 to count up the variable M and then returns to a process in S450. In contrast, if the difference is zero, then the center value detection process proceeds to a process in S480.

In S480, the microcomputer 100 determines whether a calculation result in S450 is on the decline before the difference is determined to be zero in S460. In other words, determination is made whether the difference calculated in S450 is a negative value. The difference is zero in a case where the value of the X_data_filter[M+1] corresponds to the maximum value or the minimum value. In a case where the calculation result is on the decline, an element of the X_data_filter array gradually increases as the variable M increases. Thus, the value of the X_data_filter[M+1] is determined to be the maximum value. Further, in a case where the calculation result is on the incline, the element of the X_data_filter array gradually decreases as the variable M increases. Thus, the value of the X_data_filter[M+1] is determined to be the minimum value.

If, in S480, the microcomputer 100 determines that the calculation result is on the decline, the center value detection process proceeds to a process in S490, where the value of the X_data_filter[M+1] is assigned to the variable X_max for the maximum value. Then, the center value detection process proceeds to a process in S510. In contrast, if, in S480, the microcomputer 100 determines that the calculation result is on the incline, then the center value detection process proceeds to a process in S500, where the value of the X_data_filter[M+1] is assigned to the variable X_min for the minimum value. Then, the center value detection process proceeds to a process in S510.

In S510, the microcomputer 100 determines whether the value of the variable M is equal to the element number of the X_data_filter array. If the value of the variable M is smaller than the element number of the X_data_filter array, then the center value detection process returns to a process in S470 to repeat respective processes in S450 to S510. In other words, calculation is sequentially made for a difference between two X-axis detection values that are detected in a row among the series of X-axis detection values detected during the set time Ta. Then, the X-axis detection value at the time where the difference is zero is acquired as the maximum value or the minimum value.

If the value of the variable M is equal to the element number of the X_data_filter array, then the center value detection process proceeds to a process in S520, where an average value between the variable X_max and the variable X_min is calculated as the X-axis center value. Then, the present center value detection process using the differential calculus ends.

<2-2-3. Fourier Transform Method>

Figure 11:
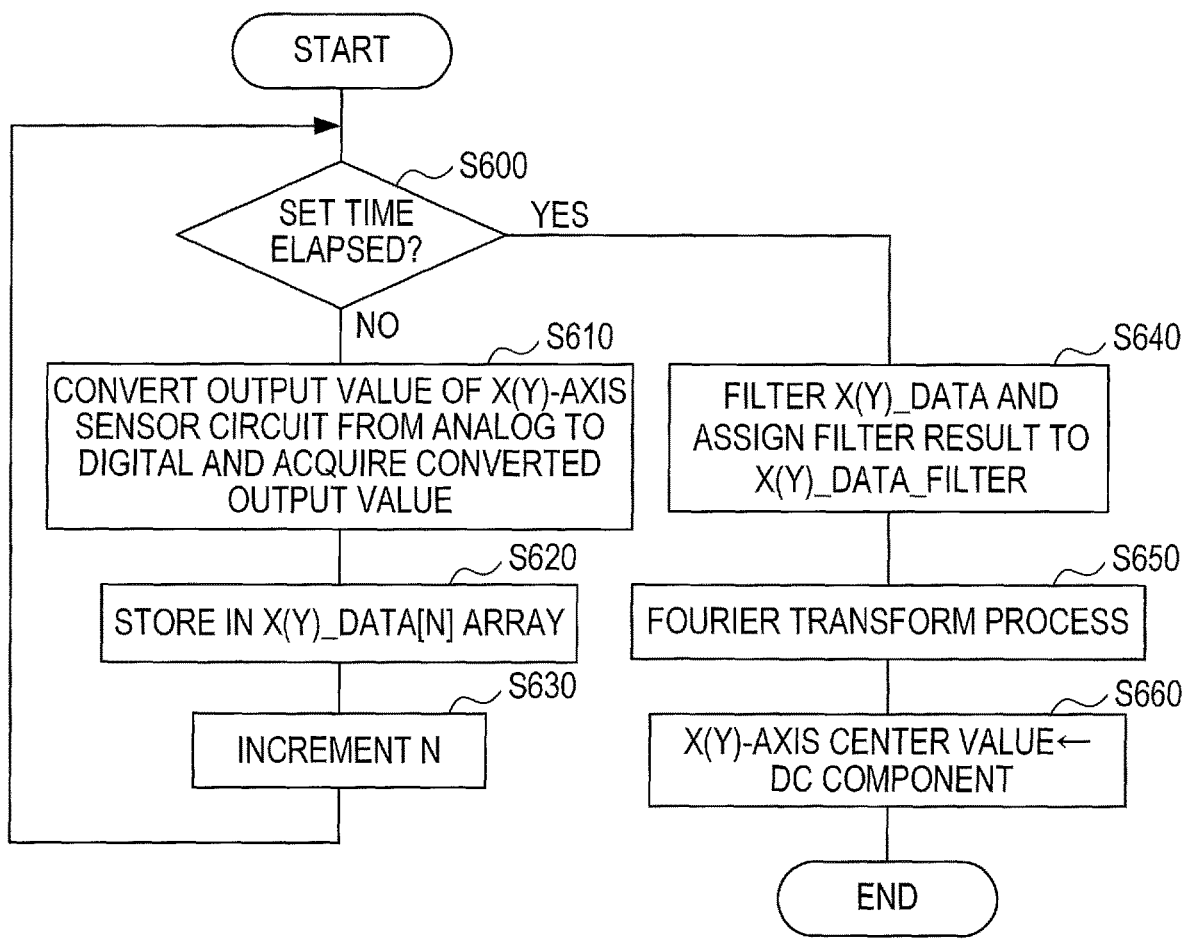
FIG. 11 a flowchart showing a process to detect the center value by a Fourier transform method.

Next, descriptions are given to a center value detection process using a Fourier transform method with reference to the flowchart of FIG. 11.

First of all, S600 to S640 execute the same processes in S200 to S240.

Then, the center value detection process proceeds to S650, where a Fourier transform process is executed to the X_data_filter array so that a DC component is extracted.

Then, the center value detection process proceeds to S660, where the DC component extracted in S650 is detected as the X-axis center value. Then, the present center value detection process using the Fourier transform method ends.

<2-2-4. Digital Filter Method>

Figure 12:
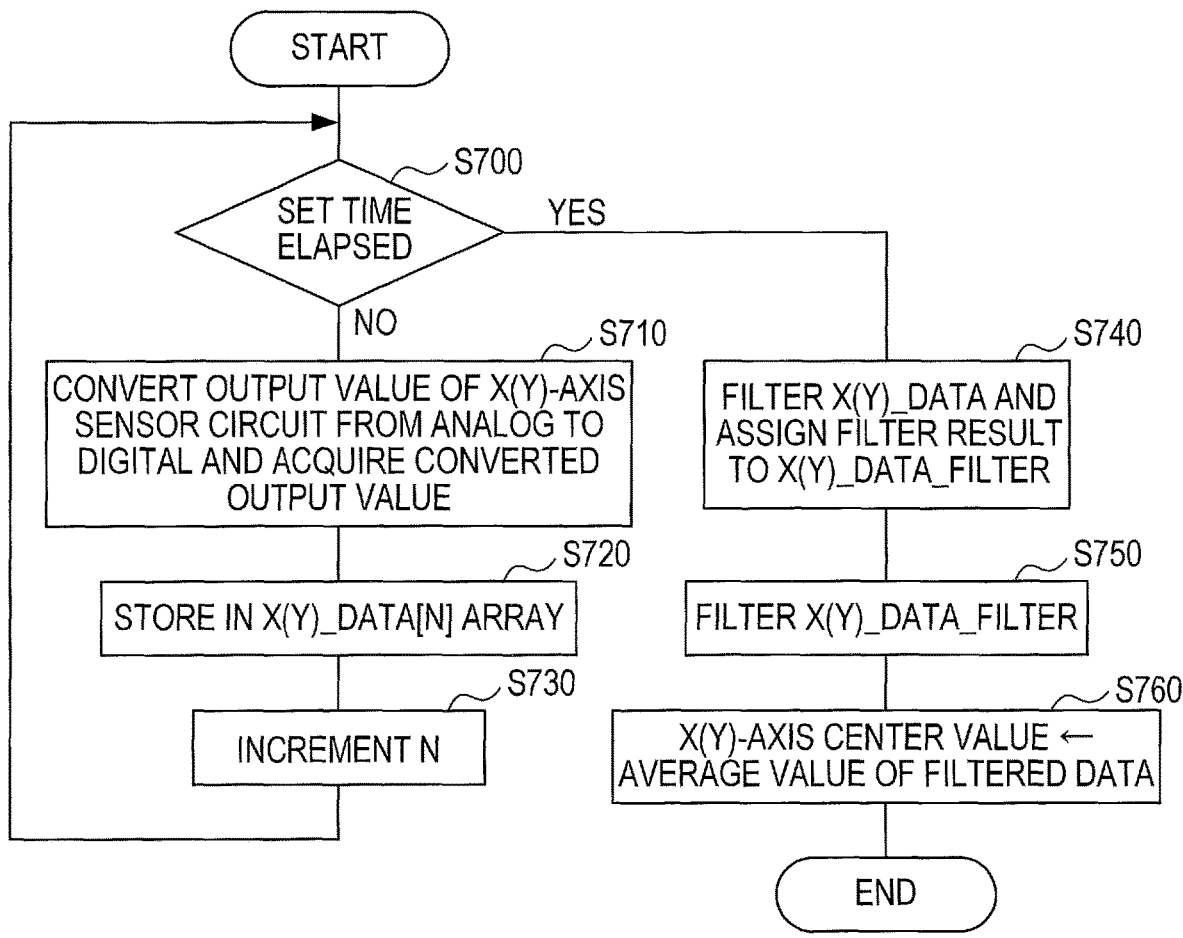
FIG. 12 is a flowchart showing a process to detect the center value by a digital filter method.

Next, descriptions are given to a center value detection process using a digital filter method with reference to the flowchart of FIG. 12.

First of all, S700 to S740 execute the same processes in S200 to S240.

Then, the center value detection process proceeds to S750, where a digital low-pass filter process is executed to the X_data_filter array so that an AC component due to the building vibrations is eliminated from the element of the X_data_filter array.

Then, the center value detection process proceeds to S760, where an average value of an element of data, which is filtered in the digital low-pass filter process in S750, is calculated as the X-axis center value. Here, it is difficult to implement a digital filter in which a passband and a cutoff band each have ideal characteristics. Due to this difficulty, the data filtered in the digital low-pass filter process may have other components in addition to the DC component. Therefore, the data filtered in the digital low-pass filter process is averaged so that the DC component is uniquely calculated. Then, the present center value detection process using the digital filter method ends.

<2-2-5. Top-Hold Circuit and Bottom-Hold Circuit>

Figure 13:
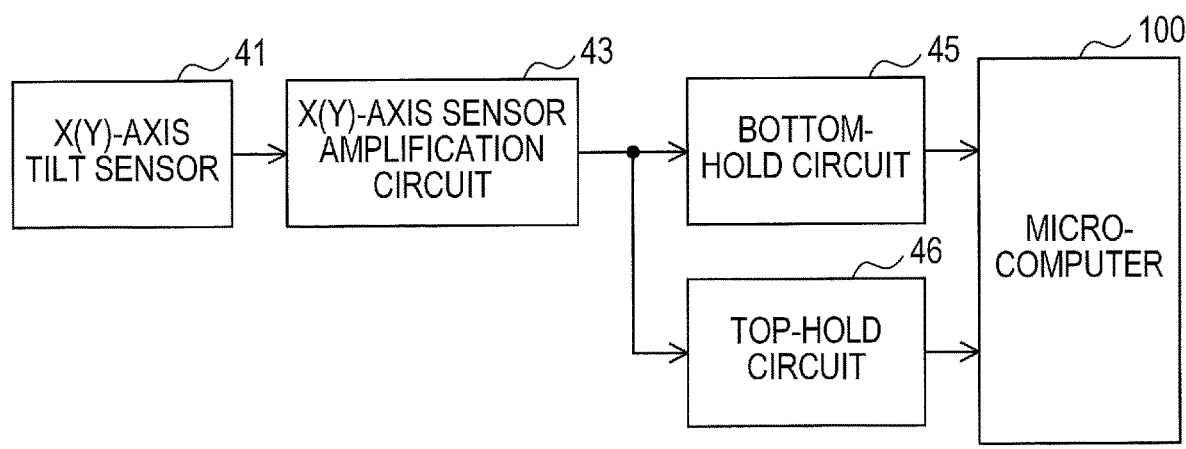
FIG. 13 is a diagram showing a configuration in which the X-axis sensor is provided with, in an output side thereof, a bottom-hold circuit and a top-hold circuit.
Figure 14:
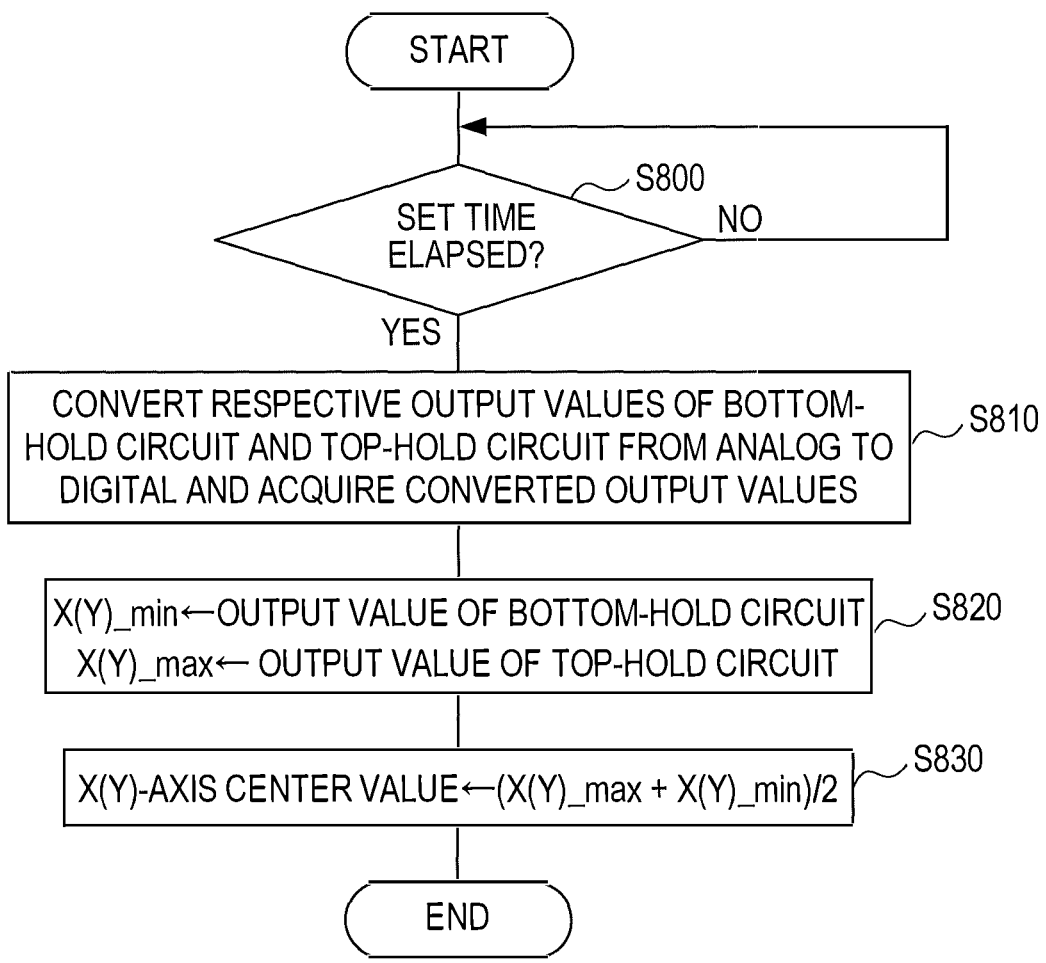
FIG. 14 is a flowchart showing a process to detect the center value using the bottom-hold circuit and the top-hold circuit.

Next, descriptions are given to a method using a top-hold circuit and a bottom-hold circuit with reference to FIGS. 13 and 14.

As shown in FIG. 13, according to the present method, a bottom-hold circuit 45 and a top-hold circuit 46 are placed in parallel between the X-axis sensor amplification circuit 43 (specifically, the first amplification circuit 43A) and the microcomputer 100.

The bottom-hold circuit 45 stores a bottom value of output values of the X-axis sensor amplification circuit 43 and outputs the stored bottom value to the microcomputer 100. The top-hold circuit 46 stores a peak value of the output values of the X-axis sensor amplification circuit 43 and outputs the stored peak value to the microcomputer 100. The bottom-hold circuit and the top-hold circuit are also placed between the Y-axis sensor amplification circuit 44 and the microcomputer 100; however, descriptions are omitted here.

Next, descriptions are given to a center value detection process using the bottom-hold circuit 45 and the top-hold circuit 46 with reference to FIG. 14.

First of all, in S800, the microcomputer 100 determines whether the set time Ta elapses from the start of the acquisition of the series of X-axis detection values. If the microcomputer 100 determines that the set time Ta does not elapse, then the center value detection process repeats a process in S800. In contrast, if the microcomputer 100 determines that the set time Ta elapses, then the center value detection process proceeds to a process in S810.

Then, S810 converts the output value of the bottom-hold circuit 45 and the output value of the top-hold circuit 46 from analog to digital and acquires the converted output value of the bottom-hold circuit 45 and the converted output value of the top-hold circuit 46. Here, the minimum value and the maximum value of the series of X-axis detection values that are detected during the set time Ta are acquired.

Then, the center value detection process proceeds to S820, where the output value of the bottom-hold circuit 45 is assigned to the variable X_min for the minimum value and the output value of the top-hold circuit 46 is assigned to the variable X_max for the maximum value.

Then, the center value detection process proceeds to S830, where an average value between the variable X_max and the variable X_min is calculated as the X-axis center value. The present center value detection process using the bottom-hold circuit 45 and the top-hold circuit 46 ends.

<3. Effects>

According to the present embodiment described above, the following effects are exhibited.

(1) The tilt of the movable portion 13 with respect to the supporter 16 is adjusted such that the X-axis center value and the X-axis reference value coincide with each other. Further, the tilt of the movable portion 13 with respect to the supporter 16 is adjusted such that the Y-axis center value and the Y-axis reference value coincide with each other. Here, the X-axis center value and Y-axis center value correspond to an angle of a tilt of the movable portion 13 with respect to a horizon on which a building rests along a gravity direction, which is the center of vibrations in the form of sine waves. Accordingly, controlling the X-axis motor 60 and the Y-axis motor 80, which is executed such that the X-axis center value and the X-axis reference value coincide with each other and the Y-axis center value and the Y-axis reference value coincide with each other, allows the laser line to be emitted with a reference having enhanced accuracy in a vibrating multistory building.

(2) If the hill climbing and gradient descent methods are used, the series of X-axis detection values is sequentially compared, which enables acquisition of the maximum value and the minimum value of the series of X-axis detection values. Further, the maximum value and the minimum value are averaged, which enables a detection of the X-axis center value. In the same manner, the Y-axis center value can be detected.

(3) If the differential calculus is used, the X-axis detection value, at the time when the difference between the two X-axis detection values detected in a row becomes zero, can be acquired as the maximum value and the minimum value of the series of X-axis detection values. Further, the maximum value and the minimum value are averaged, which enables detection of the X-axis center value. In the same manner, the Y-axis center value can be detected.

(4) If the Fourier transform method is used, the series of X-axis detection values is transformed by Fourier transformation, which enables the DC component of the series of X-axis detection values to be detected as the X-axis center value. In the same manner, the Y-axis center value can be detected.

(5) If the digital filter method is used, the series of X-axis detection values is filtered in the digital low-pass filter process, which enables the DC component of the series of X-axis detection values to be detected as the X-axis center value. In the same manner, the Y-axis center value can be detected.

(6) If the top-hold circuit 46 and the bottom-hold circuit 45 are used, the top-hold circuit 46 detects the maximum value among the series of X-axis detection values and the bottom-hold circuit 45 detects the minimum value among the series of X-axis detection values. Accordingly, the output value of the top-hold circuit 46 and the output value of the bottom-hold circuit 45 are averaged, which enables detection of the X-axis center value. In the same manner, the Y-axis center value can be detected.

(7) The tilt of the movable portion 13 with respect to the supporter 16 is adjusted based on the first X-axis detection values and the first Y-axis detection values that are filtered in the first filter process. Further, the determination is made whether to execute the re-leveling process based on the second X-axis detection values and the second Y-axis detection value that are filtered in the second filter process. Accordingly, it is possible to use the series of X-axis detection values and the series of Y-axis detection values that are filtered in either the filter process suitable for the adjustment of the tilt of the movable portion 13 or the filter process suitable for a determination on execution of the re-leveling process.

(8) In determining whether to execute the re-leveling process, it may be desirable to use the series of X-axis detection values and the series of Y-axis detection values that have the reduced amplifications in respect of the frequency component that is higher relative to the building vibrations. In contrast, if the leveling process is executed in the building vibration adaptive mode, it may be desirable to use the series of X-axis detection values and the series of Y-axis detection values that are affected by the building vibrations. Accordingly, the time constant of the second amplification circuit 43B is set to have a greater value relative to the time constant of the first amplification circuit 43A, thereby ensuring responsiveness in executing the leveling process and, at the same time, inhibiting the re-leveling process from being executed in response to the slight impact.

(9) If the second X-axis detection values or the second Y-axis detection value, which is filtered in the second filter process, exceeds a determination threshold value, then the re-leveling process is executed. This inhibits the re-leveling process from being executed in response to the slight impact and, at the same time, allows the re-leveling process to be executed in response to the forceful impact.

(10) The building vibration adaptive mode switch 32 sets the building vibration adaptive mode, which enables execution of the leveling process that deals with building vibrations peculiar to the multistory building.

Other Embodiments

Although the embodiment for practicing the present disclosure has been described above, the present disclosure is not limited to the above-described embodiment, but may be practiced in various forms.

(a) In the above-described embodiment, the actuator of the X-axis and the actuator of the Y-axis, respectively, are the X-axis motor 60 and the Y-axis motor 80. However, the actuators are not limited to motors and may be, for example, piezoelectric elements.

(b) In the above-described embodiment, the X-axis tilt sensor 41 and the and Y-axis tilt sensor 42 each are a bubble sensor. However, the tilt sensor is not limited to the bubble sensor and may be, for example, an acceleration sensor, a tilt sensor of electrostatic capacitance type, or the like.

(c) In the above-described embodiment, the X-axis tilt sensor 41 and the microcomputer 100 interpose therebetween the first amplification circuit 43A and the second amplification circuit 43B. However, the microcomputer 100 may execute the digital filter process without amplification circuits. In other words, the microcomputer 100 may execute the first filter process and the second filter process that have respective different time constants.

(d) A plurality of functions performed by a single element in the aforementioned embodiments may be achieved by a plurality of elements or a function performed by a single element may be achieved by a plurality of elements. Also, a plurality of functions performed by a plurality of elements may be achieved by a single element or a single function performed by a plurality of elements may be achieved by a single element. A part of a configuration in the aforementioned embodiments may be omitted. Also, at least a part of a configuration in the aforementioned embodiments may be added to or replaced with another configuration in the aforementioned embodiments.

What is claimed is:

1. A laser marker comprising:
a cylindrical cover including a main power switch and a building vibration adaptive mode switch;
a supporter including a leg part and a base table, the leg part having the cylindrical cover mounted on the leg part, the base table being provided on the leg part with the base table housed in the cylindrical cover, the base table having a columnar shape, and the base table having an upper surface in which a first fitting hole is provided in a center of the upper surface;
a movable portion arranged over the base table with the movable portion housed in the cylindrical cover, the movable portion having a bottom surface in which a second fitting hole is provided in a center of the bottom surface, the movable portion also including three or more laser diodes and an X-axis tilt sensor, the X-axis tilt sensor being configured to detect an X-axis tilt of the movable portion, the X-axis tilt corresponding to a tilt of the movable portion with respect to an X-axis on a horizontal plane, and the X-axis tilt sensor being further configured to output an X-axis detection value that indicates the X-axis tilt;
a coupling member housed in the cylindrical cover, the coupling member including a lower portion, an upper portion, and an intermediate portion, the lower portion being fixed to the first fitting hole, the upper portion being tiltably fitted into the second fitting hole, the intermediate portion coupling the lower portion and the upper portion together;
an X-axis motor fixed above the upper surface of the base table with the X-axis motor housed in the cylindrical cover, and the X-axis motor being configured to change the X-axis tilt; and
a microcomputer configured to execute a leveling process, the leveling process including:
 determining whether the building vibration adaptive mode switch is turned ON;
 determining whether the main power switch has just been turned ON in response to a determination being made that the building vibration adaptive mode switch is turned ON;
 determining whether a set time elapses in response to a determination being made that the main power switch has just been turned ON, the set time being preset;
 acquiring the X-axis detection value in response to a determination being made that the set time does not elapse;
 storing a series of X-axis detection values in an array data structure in response to a determination being made that the set time elapses, each X-axis detection value of the series of X-axis detection values being the X-axis detection value acquired during the set time, and the array data structure including two or more elements;
 calculating an X-axis center value in response to the series of X-axis detection values being stored in the array data structure, the X-axis center value corresponding to a center value of the two or more elements in the array data structure; and
 controlling the X-axis motor such that the X-axis center value and an X-axis reference value coincide with each other, the X-axis reference value being preset.

2. A laser marker comprising:
a supporter;
a movable portion tiltably supported by the supporter;
at least one laser optical source provided to the movable portion, the at least one laser optical source being configured to emit at least one laser light;
a tilt sensor provided to the movable portion, the tilt sensor being configured to detect a first tilt of the movable portion with respect to the supporter, the first tilt corresponding to a tilt with respect to a first axis on a horizontal plane, and the tilt sensor being also configured to output a first detection value that indicates the first tilt;
a first actuator configured to change the first tilt of the movable portion; and
a controller configured to acquire a first series of detection values, each detection value of the first series of detection values corresponding to the first detection value outputted from the tilt sensor within a set time, the first series of detection values being different from or coinciding with each other, the set time being preset, the controller being also configured to control the first actuator such that a first center value and a first reference value coincide with each other, the first center value corresponding to a center value of the first series of detection values, and the first reference value being preset.

3. The laser marker according to claim 2,
wherein the controller is configured to determine whether a power supply from a main power source has just started, and
wherein the controller is configured to control the first actuator such that the first center value and the first reference value coincide with each other at least in response to a determination being made that the power supply has just started.

4. The laser marker according to claim 2,
wherein the controller is configured to (i) sequentially make comparison among the first series of detection values, to thereby (ii) acquire a maximum value and a minimum value of the first series of detection values, and
wherein the controller is configured to average the maximum value and the minimum value to set an averaged value as the first center value.

5. The laser marker according to claim 2,
wherein the first series of detection values includes a first pair of detection values and a second pair of detection values, each of the first pair of detection values and the second pair of detection values including two detection values that are detected in a row, and the two detection values are to be considered to have zero difference therebetween, and
wherein the controller is configured to average one detection value of the first pair of detection values and one detection value of the second pair of detection values to set an averaged value as the first center value.

6. The laser marker according to claim 2,
wherein the controller is configured to set a DC component of the first series of detection values as the first center value.

7. The laser marker according to claim 6,
wherein the controller applies Fourier transformation to the first series of detection values to extract the DC component.

8. The laser marker according to claim 6,
wherein the controller executes a digital low-pass filter process to the first series of detection values to extract the DC component.

9. The laser marker according to claim 2, further including:
a top-hold circuit configured to store a peak value of the first series of detection values; and
a bottom-hold circuit configured to store a bottom value in the first series of detection values,
wherein the controller is configured to average the peak value stored in the top-hold circuit and the bottom value stored in the bottom-hold circuit to set an averaged value as the first center value.

10. The laser marker according to claim 2, further including
a second actuator configured to change a second tilt of the movable portion with respect to the supporter,
wherein the second tilt corresponds to a tilt with respect to a second axis on the horizontal plane, the second axis being perpendicular to the first axis,
wherein the tilt sensor is also configured to detect the second tilt and configured to output a second detection value that indicates the second tilt,
wherein the controller is configured to acquire a second series of detection values, each detection value of the second series of detection values corresponding to the second detection value outputted from the tilt sensor within the set time, the second series of detection values being different from or coinciding with each other, and
wherein the controller is also configured to control the second actuator such that a second center value and a second reference value coincide with each other, the second center value corresponding to a center value of the second series of detection values, and the second reference value being preset.

11. The laser marker according to claim 2, further including:
a first filter configured to execute a first filter process to the first series of detection values; and
a second filter configured to execute a second filter process to the first series of detection values, the second filter process being different from the first filter process,
wherein the controller is configured to control the first actuator based on the first series of detection values that is filtered in the first filter process, and
wherein the controller is configured to determine whether to re-execute control of the first actuator based on the first series of detection values that is filtered in the second filter process.

12. The laser marker according to claim 11,
wherein the first filter has a first time constant,
wherein the second filter has a second time constant, and
wherein the second time constant is greater than the first time constant.

13. The laser marker according to claim 12,
wherein the controller is configured to determine to re-execute the control of the first actuator in response to a filtered detection value exceeding a specified determination threshold value, the filtered detection value corresponding to the first series of detection values filtered in the second filter process.

14. The laser marker according to claim 2, including a setting switch configured to set a building vibration adaptive mode,
wherein the controller is configured to control the first actuator based on the first center value in response to the building vibration adaptive mode being set via the setting switch.

15. An electronic leveling method of a laser marker, comprising:
acquiring a series of detection values, each detection value of the series of detection values corresponding to a detection value of a tilt of a movable portion detected within a set time, the series of detection values being different from or coinciding with each other, the movable portion being tiltably supported by a supporter of the laser marker, and the movable portion including at least one laser optical source, the tilt of the movable portion corresponding to a tilt with respect to the supporter, the set time being preset;
calculating a center value of the acquired series of detection values; and
controlling at least one actuator included in the laser marker such that the calculated center value and a specified reference value coincide with each other, the at least one actuator being configured to change the tilt of the movable portion.

* * * * *